United States Patent
Gilling

(10) Patent No.: US 11,080,115 B2
(45) Date of Patent: Aug. 3, 2021

(54) SAMPLING MANAGEMENT OF APPLICATION PROGRAMMING INTERFACE (API) REQUESTS

(71) Applicant: Moesif, Inc., San Francisco, CA (US)

(72) Inventor: Derric Gilling, San Francisco, CA (US)

(73) Assignee: Moesif, Inc., San Francisco, CA (US)

( * ) Notice: Subject to any disclaimer, the term of this patent is extended or adjusted under 35 U.S.C. 154(b) by 0 days.

(21) Appl. No.: 17/017,818

(22) Filed: Sep. 11, 2020

(65) Prior Publication Data

US 2021/0011789 A1    Jan. 14, 2021

Related U.S. Application Data

(60) Provisional application No. 62/873,181, filed on Jul. 11, 2019.

(51) Int. Cl.
*G06F 9/54* (2006.01)

(52) U.S. Cl.
CPC .................................. *G06F 9/547* (2013.01)

(58) Field of Classification Search
CPC .......... G06F 9/541; G06F 9/542; G06F 9/546; G06F 9/547
See application file for complete search history.

(56) References Cited

U.S. PATENT DOCUMENTS

| | | | |
|---|---|---|---|
| 2015/0071072 A1* | 3/2015 | Ratzin | G06F 9/455 370/235 |
| 2020/0114417 A1* | 4/2020 | Gressenbauer | B22C 9/108 |
| 2020/0117523 A1* | 4/2020 | Morrison | G06N 20/20 |
| 2020/0287920 A1* | 9/2020 | Mandrychenko | H04L 67/2828 |

* cited by examiner

*Primary Examiner* — Brian W Wathen

(57) ABSTRACT

Systems, methods, and software described herein manage and process application programming interface (API) statistics associated with an API provider. In one example, a monitoring service may identify API statistics from a set of API requests to an API provider. From the statistics, the monitoring service may determine trends of interest in the API requests and modify at least one sampling rate of API requests to API provider to obtain the API statistics.

20 Claims, 5 Drawing Sheets

| DATA STRUCTURE 400 | | FIRST API FUNCTION 405 | | | SECOND API FUNCTION 406 | |
|---|---|---|---|---|---|---|
| API USER COLUMN 410 | TIME PERIOD 412 | TIME PERIOD 413 | TIME PERIOD 414 | TIME PERIOD 412 | TIME PERIOD 413 |
| USER ID 420 | 1000 | 1050 | 975 | 1000 | 1050 |
| USER ID 421 | 1050 | 1200 | 1100 | 1050 | 1500 |
| USER ID 422 | 500 | 450 | 475 | 500 | 450 |
| USER ID 423 | 650 | 630 | 2550 | 1400 | 1350 |

TREND OF INTEREST 450

FIGURE 4

SAMPLING MANAGEMENT OF APPLICATION PROGRAMMING INTERFACE (API) REQUESTS

RELATED APPLICATIONS

This application hereby claims the benefit of and priority to U.S. Provisional Patent Application No. 62/873,181, titled "SAMPLING MANAGEMENT OF APPLICATION PROGRAMMING INTERFACE (API) REQUESTS," filed Jul. 11, 2019, and which is hereby incorporated by reference in its entirety.

BACKGROUND

Web service application programming interfaces (APIs) are defined interfaces that permit interactions to occur between the service associated with the APIs and users of the APIs. These APIs may permit users to obtain data from the service associated with the API, post data to the service associated with the API, or provide some other data operation with relation to the service associated with the API. For example, a web service API may permit an eCommerce seller to obtain shipping information, such as cost estimates, from a shipping service provider. Thus, rather than locally importing and updating the information from the shipping service provider, the eCommerce seller may obtain the required information from one or more databases maintained by the shipping service provider.

However, although APIs may provide efficient access to data between different services, difficulties can occur in determining how the various end users interact with and use the APIs. These difficulties are often compounded when an API is available to large quantities of users, each with different functional reasons for using the API.

Overview

Provided herein are systems, methods, and software to manage sampling rates of application programming interface (API) requests. In one implementation, an API monitoring service obtains first API request information from an API provider, wherein the first API request information corresponds to a first sample rate of API requests to the API provider. The API monitoring service further identifies attributes of the API requests from the API request information, determines one or more trends of interest based on the attributes, and identifying a second sample rate of API requests based on the one or more trends of interest. The API monitoring service also obtains second API request information from the API provider, wherein the second API request information corresponds to the second sample rate of API requests to the API provider.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 4 illustrates a data structure to identify trends of interest in API statistics according to an implementation.

DETAILED DESCRIPTION

Figure 1:
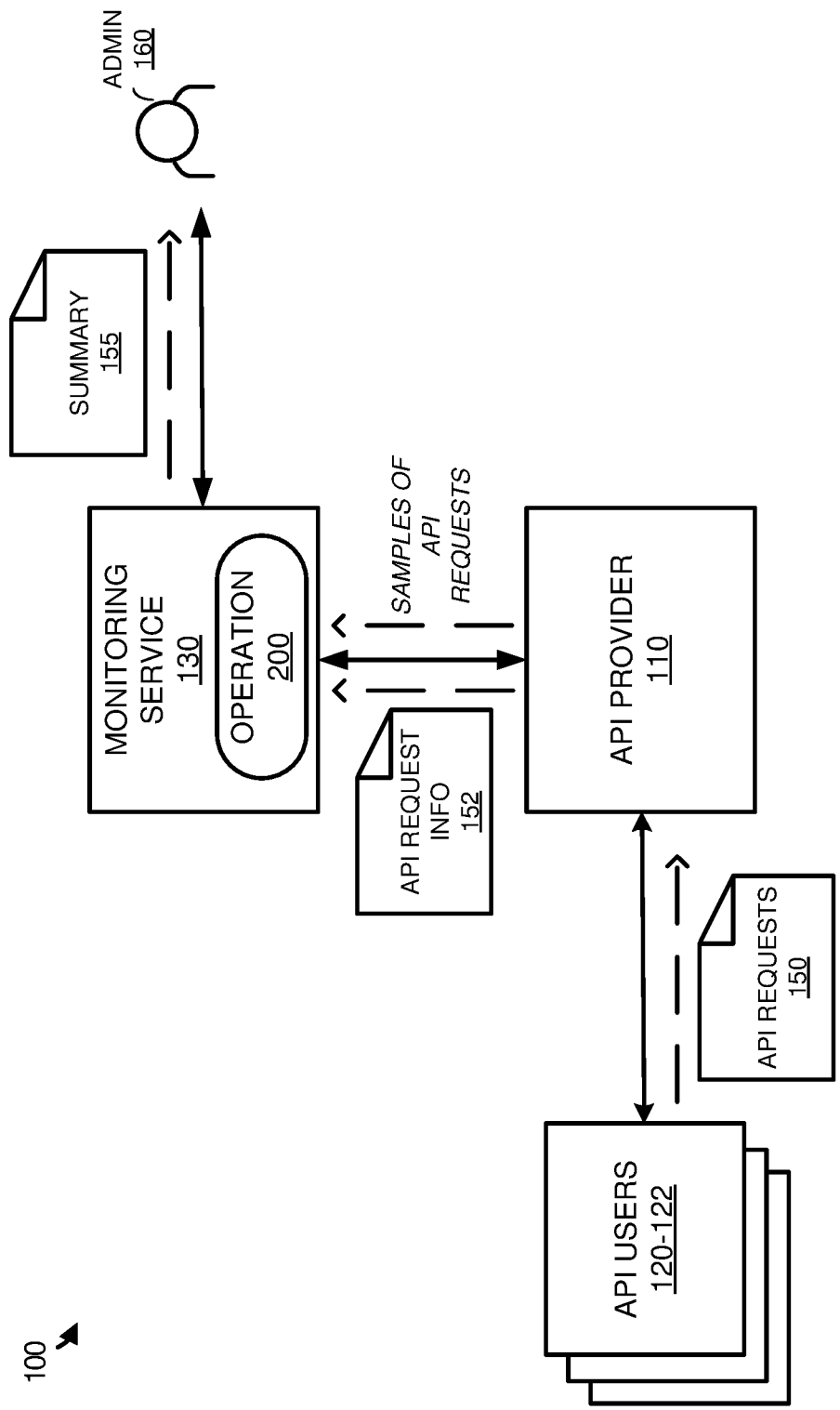
FIG. 1 illustrates a computing environment to manage application programming interface (API) statistics according to an implementation.

FIG. 1 illustrates a computing environment 100 to manage application programming interface (API) statistics according to an implementation. Computing environment 100 includes API users 120-122, API provider 110, monitoring service 130, and administrator 160. Computing environment 100 further includes API requests 150, API request information 152, and summary 155. Monitoring service 130 provides operation 200 that is further described below in FIG. 2.

In operation, API users 120-122 generate API requests 150 over a network connection to API provider 110, wherein the requests may be used to provide various functionality for the API users. API requests 150 may correspond to requests to retrieve information from a service provided by API provider 110, post information to a service provided by API provider 110, modify data stored by a service provided by API provider 110, or some other operation associated with API provider 110. As an example, an API request of API requests 150 may request a social media post corresponding to a user of a social media service provided by API provider 110. API users 120-122 may correspond to individual users, service providers, such as other web services, or some other user of a web API.

As API requests 150 are obtained by API provider 110, API request information 152 is provided to or extracted by monitoring service 130. This API request information 152 includes at least header information for the API requests obtained from API users 120-122. In some implementations, monitoring service 130 may extract header portions of the packets from API users 120-122 and relevant API attributes for the request from the header. The API attributes may include a user identifier associated with the API request, the API function call included in the request, or some other information related to the API request. Once the API attributes are extracted, the API attributes from the API requests may be used to generate various summaries of the API interactions with API provider 110.

Here, API request information 152 may correspond to a sample rate of the overall API requests to API provider 110. For example, rather than providing information about all of the requests to API provider 110, monitoring service may obtain a ratio, percentage, or other fraction of the overall requests to API provider 110. Thus, if a sample rate were ten percent of all requests to API provider 110, every tenth request to API provider 110 may be marked as relevant to monitoring service 130 and provided to monitoring service 130 as API request information 152. In some examples, the sample rate may be used for all API users, however, it should be understood that the rate may be different for the various API users.

In addition to using sampling in obtaining the API request information, monitoring service 130 may dynamically modify the sampling rate associated with the API requests. In some implementations, monitoring service 130 may determine the sampling rate based on trends of interest in the identified attributes, wherein the trends of interest may correspond to a quantity of requests by particular users, a quantity of requests by all of the API users, a rate of change in the quantity of requests by the users, or some other trend of interest. For example, if the quantity of requests from API user 120 has an increase in requests that satisfies criteria, monitoring service 130 may increase the sampling rate that corresponds to API user 120. Conversely, if a quantity of requests from API user 120 is consistent for a period of time, monitoring service 130 may decrease the sampling rate that corresponds to API user 120. This decrease may be used to decrease networking and processing resources required in gathering API data associated with API user 120.

Figure 2:
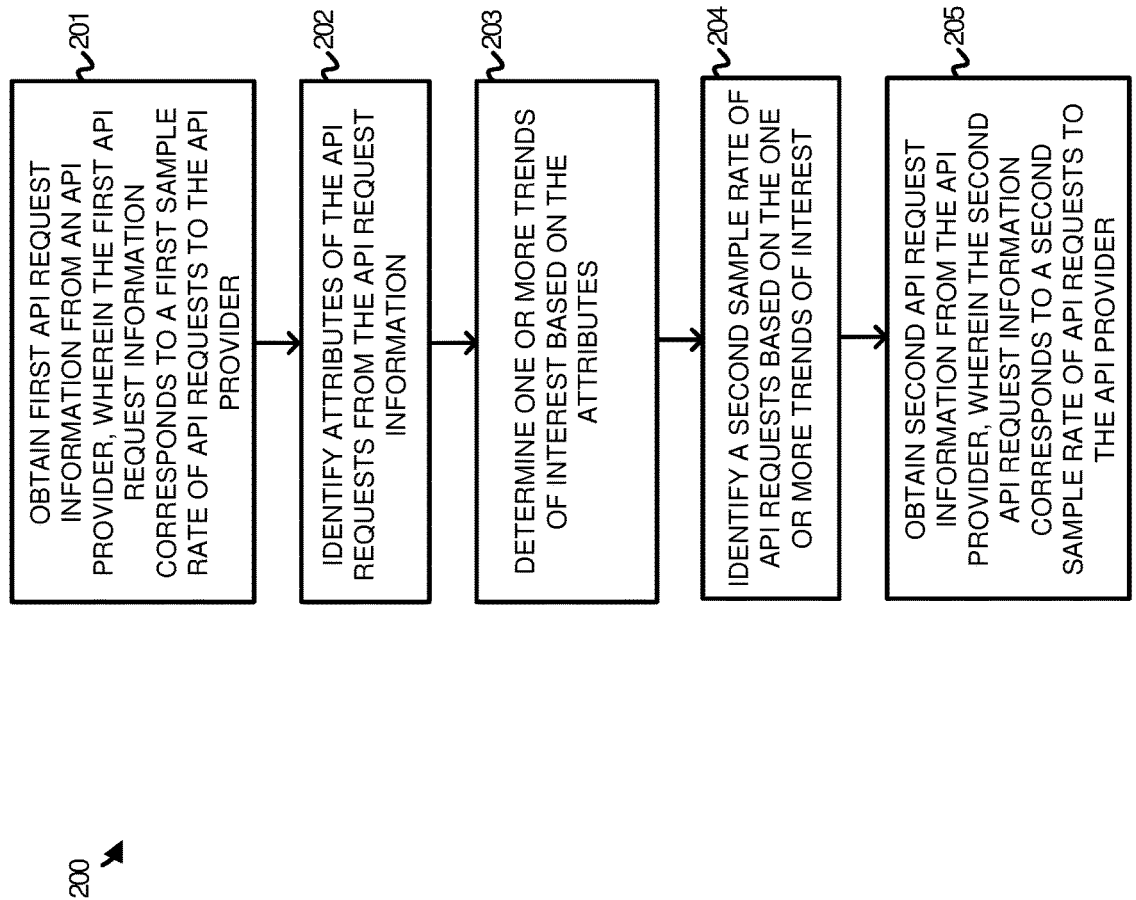
FIG. 2 illustrates an operation of managing a sampling rate for API statistics according to an implementation.

FIG. 2 illustrates an operation 200 of managing a sampling rate for API statistics according to an implementation. The processes of operation 200 are referenced parenthetically in the paragraphs that follow with reference to systems and elements of computing environment 100 of FIG. 1.

As depicted, operation 200 includes obtaining (201) first API request information from an API provider, wherein the first API request information corresponds to a first sample rate of API requests to the API provider. In some implementations, an API provider receives API requests 150 from API users 120-122, wherein the requests correspond to various operations associated with a service provided by API provider 110. As the requests are obtained, a sample of the requests are identified as relevant to monitoring service 130 and API request information 152 that corresponds to the relevant requests is provided to monitoring service 130. The sample rate may be unique to each API user of API users 120-122 or may be the same for all API users 120-122. The API request information may comprise the full API request packet or may comprise a portion of the API request packet, such as a header of the API request packet.

As API request information 152 is obtained from API provider 110, operation 200 further identifies (202) attributes of the API request from the API request information. The attributes may comprise an API user associated with the request, the API function requested, a time stamp associated with the request, or some other attribute. Once the attributes are extracted from API request information 152, operation 200 determines (203) one or more trends of interest based on the attributes. The trends may correspond to individual API users of API users 120-122 or may correspond to a set of users of API users 120-122. The trends may indicate changes in overall usage of the API as a function of time, changes in the usage of specific API functions as a function of time, or some other trend. For example, attributes from API request information 152 may indicate a rate at which API user 120 provides API requests to API provider 110.

As the trends are identified for the API requests to API provider 110, monitoring service 130 and operation 200 further identifies (204) a second sample rate of API requests based on the one or more trends of interest. In some implementations, monitoring service 130 may determine when trends of interest satisfy criteria to modify the sampling rates associated with the API requests. The criteria may correspond to a rate of change in the overall API requests, may correspond to a rate of change in requests to a particular API function, or may comprise some other criteria. As an example, monitoring service 130 may monitor the usage of API provider 110 by API user 120 as a function of time. When a usage rate associated with API provider satisfies criteria, monitoring service 130 may determine that additional data is required for API user 120. As a result, monitoring service 130 may increase the sample rate associated with at least API user 120. Advantageously, to preserve networking and processing resources for API provider 110 and monitoring service 130, sampling rates associated with the API requests may only be increased as required, limiting the quantity of data that is gathered and communicated to monitoring service 130.

Once the second sample rate is determined, monitoring service 130 and operation 200 further obtains (205) second API request information from the API provider, wherein the API request information corresponds to the second sample rate of API requests to the API provider. In some implementations, monitoring service 130 may notify API provider 110 of the new sampling rate, such that API provider 110 may provide API request information 152 in accordance with the new sampling rate. In some examples, the API request information is forwarded as the API requests are obtained at API provider 110, however, the API request information may be provided periodically, during downtime periods for requests to API provider 110, or at some other interval. Once updated to the second sample rate, monitoring service 130 may continue to monitor for trends of interest and update the sampling rate as trends of interest are identified.

Although demonstrated in the previous example as increasing the sample rate associated with the API requests, monitoring service 130 may decrease the sampling rate in some examples. For example, when an API user indicates a consistent quantity of API requests over a period of time, monitoring service 130 may determine that less samples of API requests are required for the API user. In this manner, monitoring service 130 may dynamically obtain additional information associated with API requests when trends of interest are identified.

In some implementations, monitoring service 130 may provide each of the API users with the ability to opt-in to the tracking of API requests. For example, an API user may opt-out of the tracking of the API requests. As a result, monitoring service 130 will not obtain any samples of the requests that correspond to the user, wherein the user may correspond to an individual, company, or some other organization. In other examples, monitoring service 130 may dynamically update the sample rate associated with an API user based on historical data or sample rate limits associated with the API user. For instance, ten API users may be associated with monitoring service 130, but two of the API users may infrequently make queries to API service 110. To monitor the queries of the two API users, monitoring service 130 may obtain information about all of the API requests associated with the two API users. In contrast, if an API user frequently generates requests to API provider 110, then monitoring service 130 may dynamically update the sample rate based on preferences of the API user, historical API request information associated with the API requests, or based on some other factor. Advantageously, while a first subset of API users may specify the sample rate associated with their API requests, a second subset of API users may update their sample rate based on historical information, preferences of the API user, or some other factor, including combinations thereof.

In some examples, the sampling rate may be defined and modified based on behavioral cohorts or a group for the user. The group of users may comprise users from the same location, users in the same industry, users of the same size organization, or some other similarity information, including combinations thereof. The users may be allocated an original sampling rate based on preferences for the group, which can be modified based on trends identified from the users of the group, wherein the trends may correspond to increases in requests, changes in the types of requests, security issues, or some other trend identified from sampled API requests.

Figure 3:
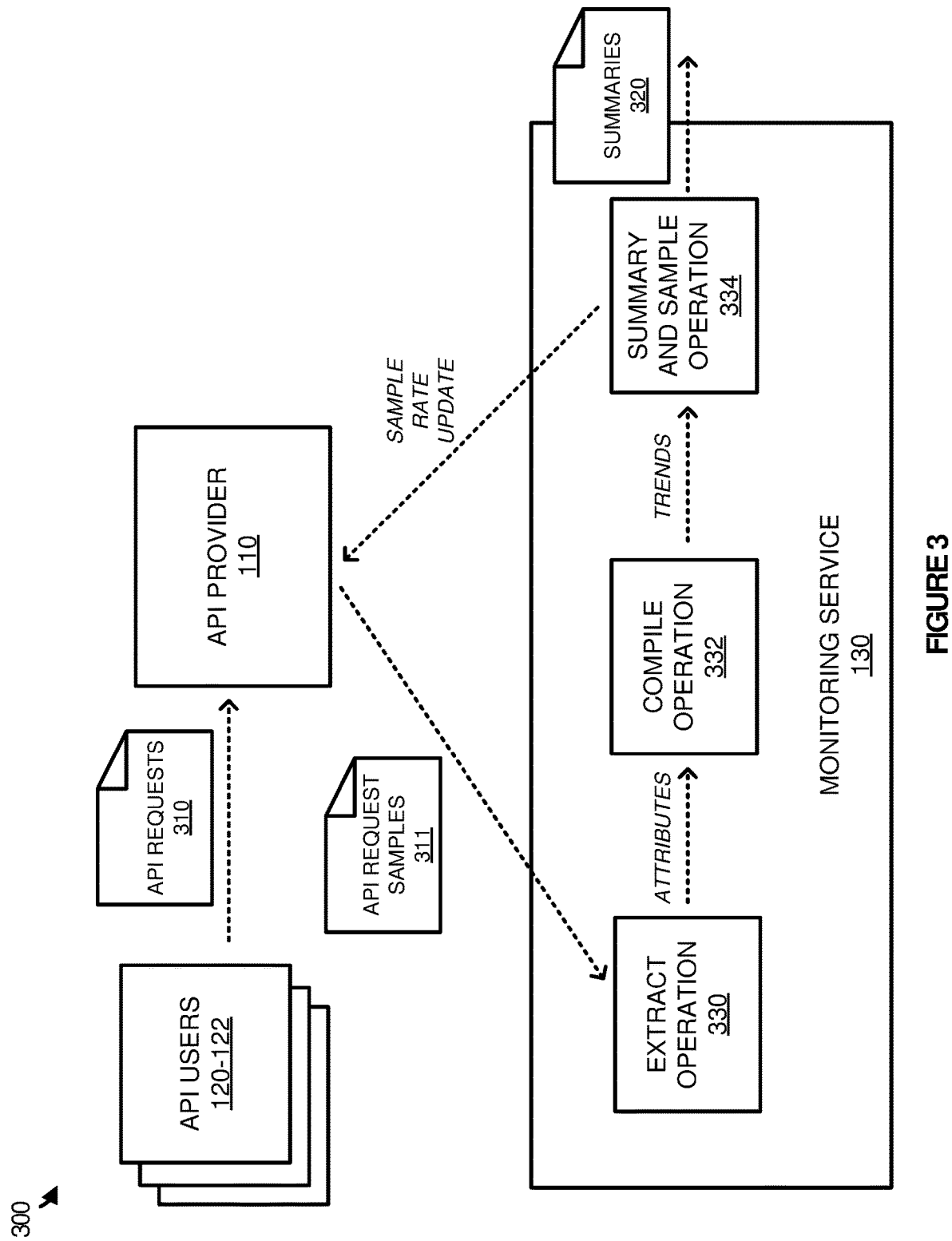
FIG. 3 illustrates an operational scenario of managing API statistics according to an implementation.

FIG. 3 illustrates an operational scenario 300 of generating an API statistical summary according to an implementation. Operational scenario 300 includes API users 120-122, API provider 110, and monitoring service 130 from computing environment 100 of FIG. 1. Operational scenario 300 further includes API requests 310 and summaries 320. Monitoring service 130 further includes extract operation 330, compile operation 332, and summary and sample operation 334.

In operation, API users 120-122 generate API requests 310 that are received by API provider 110, wherein the requests may each correspond to a request for data from the API service, a request to post data to the API service, or a request to provide some other operation associated with the API service. For example, an API request in API requests 310 may correspond to a request to obtain a social media post from a social media service. When API requests 310 are obtained by API provider 130, API request samples 311 is forwarded to monitoring service 130, wherein the request samples are identified based on a sample rate for the API requests to API provider 110. Thus, if a sample rate indicated that half of all API requests should qualify to be sent to monitoring service 130, API provider 110 may identify the relevant requests as they are received and provide the relevant requests to monitoring service 130. In some implementations, the sample rate may be the same for all API users. In other implementations, the sample rate may be different for each API user or subsets of API users. Consequently, API provider 110 may perform inspection on the requests to identify the API user associated with the request and select a subset of the API requests based on the sampling rate associated with the API user.

Once API request samples 311 are obtained by monitoring service 130, monitoring service 110 may perform extract operation 330 to extract relevant attributes from the headers of API request samples 311. These attributes may include an identifier associated with the API user that generated the request, a time stamp for the request, an API function identifier for the API function being requested, or some other attribute from the API requests. After the attributes are extracted from API request samples 311, the attributes are compiled using compile operation 332. In some implementations, monitoring service 130 may store the attributes in one or more data structures with attributes identified from the various API request packets. Compile operation 110 may analyze the identified attributes from the API requests and determine trends associated with API users 120-122. In some examples, the trends may correspond to information about the quantity of API requests as a function of time for a specific API user, information about the quantity of API requests as a function of time for a set of users, information about the individual functions associated with the requests as a function of time, or some other trend associated with the API requests.

Once the attributes associated with API requests 310 are compiled (in some examples with attributes from other previously received API requests), summary and sample operation 334 may be used to generate summaries 320 based on the identified trends. The summary may comprise graphs, tables, lists of statistics, or some other summary of the API requests to API provider 110. In some implementations, the summary may be generated based on a request from an administrator associated with the API provider, wherein the administrator may provide various preferences associated with the summary. For example, an administrator may generate a request for a summary that corresponds to API requests for a particular API user as a function of time. As a result, the corresponding attributes or data associated with the API user may be used to generate a summary that corresponds to the request.

In other implementations, rather than generating a summary in response to a request by the administrator, monitoring service 130 may generate a summary based on trends in the API requests satisfying criteria. The criteria may correspond to API request rates by the API users, API request rates to specific API functions, or some other criteria. Once the criteria are satisfied, a summary may be generated, wherein the summary may indicate various information about the trend and the criteria that triggered the generation of the response. In some examples, the summary may be provided as a notification to the administrator, where the notification may comprise a pop-up message associated with an application, an email, a text message, or some other summary. Advantageously, when a change occurs in the usage of the API, an administrator may be provided with a summary that indicates information about the change, permitting the administrator to make changes to the API to fix any undesirable trends.

Here, in addition to generating summaries 320 that are provided to administrators of the API, summary and sample operation 334 may identify trends of interest that correspond to the sample rate of API requests to API provider 110. These trends of interest may correspond to the rate of requests by all API users, the rate of requests by a subset of the API users, the rate of requests associated with specific API functions, or some other trend of interest. For example, if the rate of requests to the API service fell below a threshold, a trend of interest may be identified. In response to identifying the trend of interest, summary and sample operation 334 may identify a new sample rate and notify API provider 110 of the new sample rate. This new sample rate may be used to collect additional API request information from a larger sample of requests. The new sample rate may be used in identifying additional trends that may correlate to the drop in API requests. For example, if the API included an error, the additional samples may be used to identify the API function or functions associated with the error.

FIG. 4 illustrates a data structure 400 to manage API statistics according to an implementation. Data structure 400 is an example data structure that can be maintained by monitoring service 130 of FIG. 1. Data structure 400 includes first API functions 405-406, API user column 410, and columns for time periods 412-414. API user column 410 includes user identifiers 420-423 that correspond to the various users of the API provider.

As described herein, an API provider may obtain API requests corresponding to various API functions from one or more users of the API. As the requests are obtained, API request information may be provided to a monitoring service that is capable of processing and analyzing the data from the API requests. In some implementations, the API provider may provide at least header information for the API requests to the monitoring service, wherein the header information may include attributes associated with the API requests. Once obtained by the monitoring service, the monitoring service may extract the relevant attributes and use the attributes from the various API request packets to monitor trends in the requests to the API provider.

Here, as the attributes are extracted from the API request headers, the monitoring service maintains data structure 400 that represents a quantity of API requests to API functions 405-406 as a function of time. Time periods 412-414 may be representative of minutes, hours, days, or some other time period. From data structure 400, the monitoring service may generate summaries that include subsets of the attribute data obtained from the API request packets, wherein the summary may be demonstrated as a table, as a graph, as a natural language summary, or some other summary for an administrator associated with the API provider. In some implementations, the summary may be generated based on a request from an administrator, however, the summary may be generated when different criteria are satisfied from the attributes. For example, trends may be identified based on increased or decreased usage rates of API functions.

In the example of data structure 400, first API function 405 includes quantities of API requests over time periods 412-414, where time period 414 for first API function 405 and user ID 423 is identified as a trend of interest 450. Trend of interest 450 may be identified based on a rate of increase in the API requests, a quantity of requests exceeding a threshold, a rate of decrease in the API requests, a quantity of requests falling below a threshold, or by some other means. Once the trend of interest is identified, the monitoring service may determine whether a change is required to the sampling rate of API requests to the API provider. If a modification is required based on the trend of interest, the monitoring service may notify the API provider, permitting the API provider to identify and forward API request information corresponding to change in the sampling rate.

Referring to the example in data structure 400, when trend of interest 450 is identified, the monitoring service may determine that additional information is required for user ID 423. To provide the additional information, the monitoring service may change the sampling rate associated with user ID 423 and at least API function 405. This modification to the sampling rate may include increasing the sampling rate individually for API function 405, may include increasing the sampling rate for all requests that correspond to user ID 423, or providing some other increase in the sampling rate. In some implementations, the sampling rate change may be selected based on the factors associated with the trend of interest, wherein the factors may include the user ID associated with the trend of interest, the API function associated with the trend of interest, any timestamp information associated with the trend of interest, or some other factor associated with the trend of interest.

In some examples, the monitoring service may allocate user identifiers 420-423 to the API users when they register with the API provider, wherein the user identifiers are included in API request packets to the API provider. Once registered, the identifiers may also be provided to the monitoring service, permitting the monitoring service to determine which of the API users are initiating each of the API requests.

Figure 5:
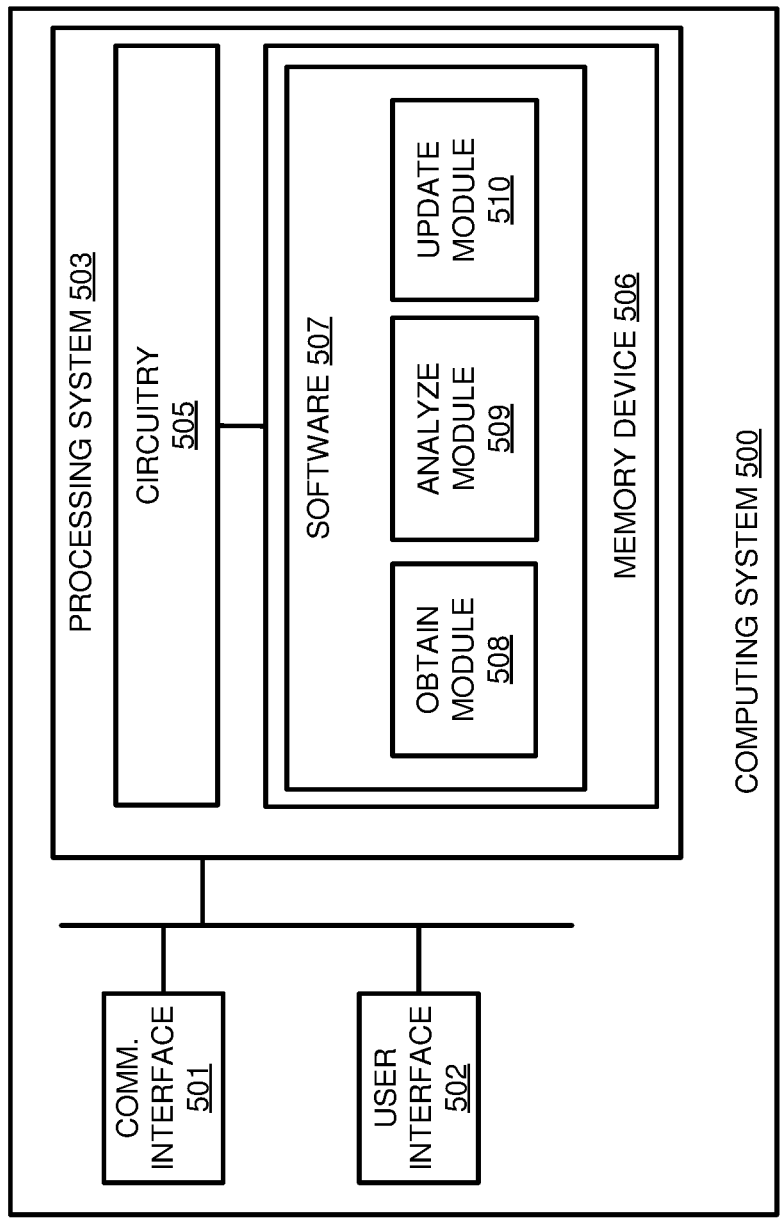
FIG. 5 illustrates a computing system to manage API statistics according to an implementation.

FIG. 5 illustrates a computing system 500 according to an implementation. Computing system 500 is representative of any computing system or systems with which the various operational architectures, processes, scenarios, and sequences disclosed herein for a management system may be implemented. Computing system 500 is an example monitoring service 130, although other examples may exist. Computing system 500 comprises communication interface 501, user interface 502, and processing system 503. Processing system 503 is linked to communication interface 501 and user interface 502. Processing system 503 includes processing circuitry 505 and memory device 506 that stores operating software 507. Computing system 500 may include other well-known components such as a battery and enclosure that are not shown for clarity.

Communication interface 501 comprises components that communicate over communication links, such as network cards, ports, radio frequency (RF), processing circuitry and software, or some other communication devices. Communication interface 501 may be configured to communicate over metallic, wireless, or optical links. Communication interface 501 may be configured to use Time Division Multiplex (TDM), Internet Protocol (IP), Ethernet, optical networking, wireless protocols, communication signaling, or some other communication format—including combinations thereof. In at least one implementation, communication interface 501 may be used to communicate with one or more computing systems that act as an API provider that receives API requests from API users. Communication interface 501 may further communicate with one or more console devices that correspond to administrators associated with the API provider. The console devices may comprise smartphones, tablets, computers, or some other console device.

User interface 502 comprises components that interact with a user to receive user inputs and to present media and/or information. User interface 502 may include a speaker, microphone, buttons, lights, display screen, touch screen, touch pad, scroll wheel, communication port, or some other user input/output apparatus—including combinations thereof. User interface 502 may be omitted in some examples. In some examples, user interface 502 may be used to provide summaries to administrators associated with the API provider.

Processing circuitry 505 comprises microprocessor and other circuitry that retrieves and executes operating software 507 from memory device 506. Memory device 506 may include volatile and nonvolatile, removable and non-removable media implemented in any method or technology for storage of information, such as computer readable instructions, data structures, program modules, or other data. Memory device 506 may be implemented as a single storage device but may also be implemented across multiple storage devices or sub-systems. Memory device 506 may comprise additional elements, such as a controller to read operating software 507. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing circuitry 505 is typically mounted on a circuit board that may also hold memory device 506 and portions of communication interface 501 and user interface 502. Operating software 507 comprises computer programs, firmware, or some other form of machine-readable program instructions. Operating software 507 includes obtain module 508, analyze module 509, and update module 510, although any number of software modules may provide a similar operation. Operating software 507 may further include an operating system, utilities, drivers, network interfaces, applications, or some other type of software. When executed by processing circuitry 505, operating software 507 directs processing system 503 to operate computing system 500 as described herein.

In one implementation, obtain module 508 directs processing system 503 to obtain API request information from an API provider, wherein the information comprises at least header information corresponding to packets for API requests. The API request information may be forwarded from the API provider as the requests are obtained, at periodic intervals, or at some other interval. In some examples, the API request information may correspond to a sample of the overall requests to the API provider. In particular, rather than obtaining information about all of the API requests to the API provider, the API provider may identify a subset of the requests to be provided to a monitoring service based on a sample rate defined by the monitoring service. The sample rate may be unique to each API user or may be a combined sample rate for a group of users associated with the API provider. For example, a first API user may be associated with a sample rate, while the other API users may be associated with a second sample rate. The API provider may inspect the API request packet header to determine which API user corresponds to the request. Once a request is identified as part of the sample, the API provider may provide at least the header portion of the request as the API request information to the monitoring service and obtain module 508.

When the API request information is obtained, analyze module 509 may extract relevant attributes from the API request information and process the attributes to identify trends associated with the API requests. In some implementations, the trends may correspond to the API requests of individual users, however, the trends may correspond to a group of users. In some examples, trends may be identified as the attributes are extracted from the API request information, but the trends may be identified based on an administrator request in some examples. In particular, when an administrator requests a summary, analyze module 509 may process the identified attributes and identify trends that correspond to the request. For example, the administrator may define preferences for the summary and the computing system may determine trends that corresponds to the preferences.

In addition to generating summaries based on the identified attributes, update module 510 directs processing system 503 to update the sampling rate for the API provider based on trends of interest derived from the attributes. The trends of interest may correspond to increases in API requests as a function of time, decreases in API requests as a function of time, or some other trend of interest. For example, update module 510 may identify that requests from a particular API user fall below a threshold value. In response to falling below the threshold value, update module 510 may determine that additional samples are required from at least the corresponding API user. The quantity of additional samples may be based on various factors, including the identity of the API user, the API function corresponding to the trend of interest, the amount of the increase or decrease in the requests, or some other factor. When the trend of interest is identified, update module 510 may provide an update to the API provider, such that the API provider may identify the corresponding Although demonstrated in the previous example as increasing the quantity of samples, it should be understood that update module 510 may decrease the sample rate for one or more of the API users. As an example, when a trend of interest indicates that a request rate from a particular API user is consistent for a threshold period of time, update module 510 may decrease a sample rate corresponding to the API user. Advantageously, rather than using networking and processing resources to process additional API requests, update module 510 may dynamically reduce the sample rate for the API requests.

Returning to the elements of FIG. 1, API users 120-122, API provider 110, and monitoring service 130 may each comprise communication interfaces, network interfaces, processing systems, computer systems, microprocessors, storage systems, storage media, or some other processing devices or software systems and can be distributed among multiple devices. Examples of API users 120-122, API provider 110, and monitoring service 130 can include software such as an operating system, logs, databases, utilities, drivers, networking software, and other software stored on a computer-readable medium. API users 120-122, API provider 110, and monitoring service 130 may comprise, in some examples, one or more server computing systems, desktop computing systems, laptop computing systems, or any other computing system, including combinations thereof. Although demonstrated as separate from API provider 110, it should be understood that monitoring service 130 may execute on the same computing system or systems as API provider 110.

Communication between API users 120-122, API provider 110, and monitoring service 130 may use metal, glass, optical, air, space, or some other material as the transport media. Communication between API users 120-122, API provider 110, and monitoring service 130 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between API users 120-122, API provider 110, and monitoring service 130 may be a direct link or can include intermediate networks, systems, or devices, and can include a logical network link transported over multiple physical links.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
obtaining first application programming interface (API) request information from an API provider, wherein the first API request information corresponds to a first sample rate of API requests to the API provider;
identifying attributes of the API requests from the API request information;
determining one or more trends of interest based on the attributes;
identifying a second sample rate of API requests based on the one or more trends of interest; and
obtaining second API request information from the API provider, wherein the second API request information corresponds to the second sample rate of API requests to the API provider.

2. The method of claim 1, wherein the first API request information comprises at least header information extracted from API requests to the API provider.

3. The method of claim 1, wherein the second sample rate comprises an increased sample rate from the first sample rate.

4. The method of claim 1, wherein the second sample rate comprises a decreased sample rate from the first sample rate.

5. The method of claim 1, wherein the attributes comprise an API user identifier for each of the API requests and an API function for each of the API requests.

6. The method of claim 1, wherein the one or more trends of interest comprise a rate of change in a quantity of requests from one or more users of the API provider.

7. The method of claim 1, wherein the one or more trends of interest comprise a change in API function usage as a function of time for one or more users of the API provider.

8. The method of claim 1 further comprising generating a summary for display, wherein the summary indicates the one or more trends of interest.

9. The method of claim 8, wherein generating the summary occurs in response to determining the one or more trends.

10. A computing apparatus comprising:
a storage system;
a processing system operatively coupled to the storage system; and
program instructions stored on the storage system that, when executed by the processing system, direct the computing apparatus to:
obtain first application programming interface (API) request information from an API provider, wherein the first API request information corresponds to a first sample rate of API requests to the API provider;
identify attributes of the API requests from the API request information;
determine one or more trends of interest based on the attributes;
identify a second sample rate of API requests based on the one or more trends of interest; and
obtain second API request information from the API provider, wherein the second API request information corresponds to the second sample rate of API requests to the API provider.

11. The computing apparatus of claim 10, wherein the first API request information comprises at least header information extracted from API requests to the API provider.

12. The computing apparatus of claim 10, wherein the second sample rate comprises an increased sample rate from the first sample rate.

13. The computing apparatus of claim 10, wherein the second sample rate comprises a decreased sample rate from the first sample rate.

14. The computing apparatus of claim 10, wherein the attributes comprise an API user identifier for each of the API requests and an API function for each of the API requests.

15. The computing apparatus of claim 10, wherein the one or more trends of interest comprise a rate of change in a quantity of requests from one or more users of the API provider.

16. The computing apparatus of claim 10, wherein the one or more trends of interest comprise a change in API function usage as a function of time for one or more users of the API provider.

17. The computing apparatus of claim 10, wherein the program instructions further direct the computing apparatus generate a summary for display, wherein the summary indicates the one or more trends of interest.

18. The computing apparatus of claim 17, wherein generating the summary occurs in response to determining the one or more trends.

19. An apparatus comprising:
a storage system; and
program instructions stored on the storage system that, when executed by a processing system, direct the processing system to:
obtain first application programming interface (API) request information from an API provider, wherein the first API request information corresponds to a first sample rate of API requests to the API provider;
identify attributes of the API requests from the API request information;
determine one or more trends of interest based on the attributes;
identify a second sample rate of API requests based on the one or more trends of interest; and
obtain second API request information from the API provider, wherein the second API request information corresponds to the second sample rate of API requests to the API provider.

20. The apparatus of claim 19, wherein the one or more trends of interest comprise a rate of change in a quantity of requests from one or more users of the API provider.

\* \* \* \* \*